United States Patent
Williamson et al.

[11] Patent Number: 5,866,081
[45] Date of Patent: Feb. 2, 1999

[54] DEPOSITED INNER ELECTRODE FOR CORONA DISCHARGE POLLUTANT DESTRUCTION REACTOR

[75] Inventors: Weldon S. Williamson, Malibu; Franklin A. Dolezal, Reseda, both of Calif.

[73] Assignee: Hughes Electronics Corporation, El Segundo, Calif.

[21] Appl. No.: 697,111

[22] Filed: Aug. 19, 1996

[51] Int. Cl.[6] ............... B01J 19/08; B01J 19/12; F01N 3/00
[52] U.S. Cl. .......... 422/186.04; 60/275; 422/907; 588/227
[58] Field of Search ............ 422/186.04, 907; 588/227; 180/54.1, 309; 60/275

[56] References Cited

U.S. PATENT DOCUMENTS

| | | | |
|---|---|---|---|
| 3,742,301 | 6/1973 | Burris | 317/4 |
| 4,614,573 | 9/1986 | Masuda | 204/176 |
| 4,956,152 | 9/1990 | Keough et al. | 422/181 |
| 5,458,856 | 10/1995 | Marie et al. | 422/186 |
| 5,503,809 | 4/1996 | Coate et al. | 422/186.18 |
| 5,516,493 | 5/1996 | Bell et al. | 422/186.07 |
| 5,545,380 | 8/1996 | Gray | 422/186.07 |
| 5,603,893 | 2/1997 | Gundersen et al. | 422/22 |
| 5,695,619 | 12/1997 | Williamson et al. | 204/165 |

*Primary Examiner*—Kathryn Gorgos
*Assistant Examiner*—Chrisman D. Carroll
*Attorney, Agent, or Firm*—V. D. Duraiswamy; M. W. Sales; W. K. Denson-Low

[57] ABSTRACT

In a pollutant destruction apparatus with at least one corona discharge reactor, one or more inner electrodes are deposited on the interior dielectric surface of each reactor, preferably by metal vapor deposition, to provide structural support and heat dissipation for the inner electrodes.

14 Claims, 3 Drawing Sheets

DEPOSITED INNER ELECTRODE FOR CORONA DISCHARGE POLLUTANT DESTRUCTION REACTOR

BACKGROUND OF THE INVENTION

1. Field of the Invention

This invention relates to the use of deposited inner electrodes in a corona discharge pollutant destruction reactor chamber.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the* 1994 *International Conf. on Plasma Science*, 6–8 Jun. 1994, Santa Fe, N.M., paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," now U.S. Pat. No. 5,549,795, and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 KeV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A single coaxial inner electrode that is centered along the reactor chamber generates radial electric field lines to induce a relatively uniform distribution of charges on the inner surface of the dielectric. However, one disadvantage of the coaxial inner electrode is that it is not structurally supported within the chamber and must be suspended from its ends. Moreover, when a high voltage signal is applied to the inner electrode, a large amount of heat is produced which is not effectively removed by the surrounding exhaust gas, which is a poor heat conductor. The inner electrode is therefore subjected to overheating and burnout after a prolonged exposure to high temperature.

A similar approach, but with a different reactor geometry, is taken in Rosocha et al., "Treatment of Hazardous Organic Wastes Using Silent-Discharge Plasmas," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

The disadvantages of a coaxial inner electrode described above can be alleviated by placing an off-axis paraxial wire inner electrode which is bonded to an inner surface of the dielectric, as described in co-pending application Ser. No. 08/450,449, filed May 25, 1995, "Gaseous Pollutant Destruction Apparatus and Method Using Self-Resonant Corona Discharge," now U.S Pat. No. 5,695, 619, and assigned to Hughes Aircraft Company, now doing business as Hughes Electronics. While the dielectric provides some structural support and heat dissipation for the inner electrode, they are not sufficient to ensure reliable operation.

A disadvantage of bonding is that the adhesive used may prevent the inner electrode wire from directly contacting the surface of the dielectric, thereby reducing heat dissipation for the inner electrode. Moreover, because the inner electrode is very thin, with a diameter on the order of 0.0762 mm, the adhesive may completely surround the inner electrode in some locations to prevent its exposure to the reactor chamber, thereby creating a corona "dead space" where a corona discharge cannot be generated.

A block diagram of a generic corona discharge pollutant destruction apparatus is shown in FIG. 1. A corona discharge reactor 2 takes pollutant-bearing exhaust gas 12 from an engine 6 through an inlet conduit 8, treats the exhaust gas, and discharges the treated exhaust gas 14 through an outlet conduit 10. Major pollutants in the exhaust gas 12 from the engine 6 usually include various forms of nitrogen oxides ($NO_x$), hydrocarbons (HC), and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 4 supplies high voltage pulses to the corona discharge reactor 2, HCs are oxidized to become $H_2O$ and $CO_2$, while CO is oxidized to become $CO_2$. At each voltage peak, corona charges are emitted within the reactor, producing free radicals that oxidize HC to generate $CO_2$ and $H_2O$ and CO to generate $CO_2$. In general, high voltage pulses in the range of about 10–15 kV are very effective in destroying HC and CO, whereas lower voltage pulses are more suitable for reduction of $NO_x$ into $N_2$ and $O_2$.

SUMMARY OF THE INVENTION

The present invention provides a deposited inner electrode on the inner wall of a dielectric tube that defines the reaction chamber of a corona discharge pollutant destruction reactor. Depending upon the configuration of the reactor, multiple electrodes may be deposited at different locations along the inner wall of the dielectric. The deposited inner electrode has a strong and stable contact with the dielectric, which not only provides structural support for the inner electrode, but also acts as a heat sink to transfer heat from the inner electrode, thus preventing it from overheating and burnout.

These and other features and advantages of the invention will be apparent to those skilled in the art from the following detailed description, taken together with the accompanying drawings, in which:

DETAILED DESCRIPTION OF THE INVENTION

Figure 1:
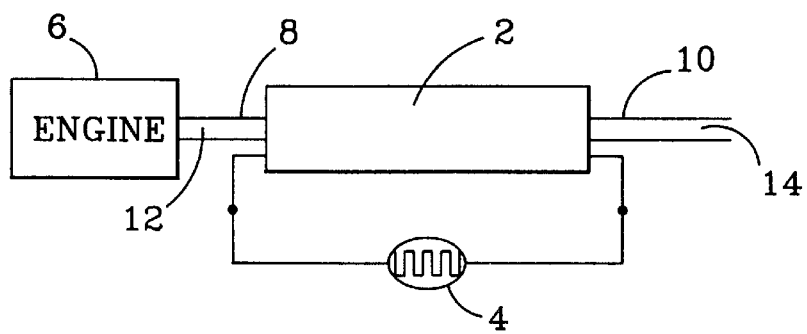
FIG. 1, described above, is a block diagram of a conventional corona discharge pollutant destruction apparatus.
Figure 2:
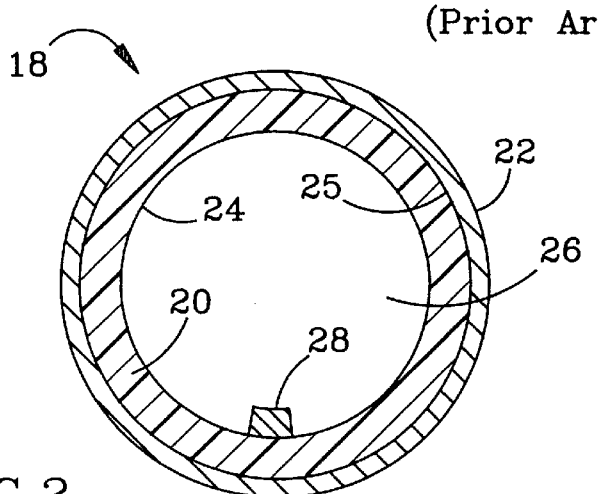
FIG. 2 is a sectional view of a corona discharge reactor with a deposited inner electrode in accordance with the invention.

FIG. 2 shows one embodiment of the invention, in which a corona discharge reactor 18 has a hollow dielectric cylinder 20 with an outer surface 25 that is enclosed by a cylindrical outer conductive layer which forms an outer electrode 22. The cross-section of the dielectric cylinder may have various shapes, but it is preferred that it be either circular or hexagonal. If the pollutant destruction apparatus employs a single reactor chamber, a circular cross-section is preferred for its geometric simplicity and ease of manufacture. However, other cross-sectional shapes are also feasible for a single reactor chamber. If the apparatus employs multiple reactors arranged in parallel to treat a pollutant-bearing gas, it is strongly preferred that each reactor have an equilateral hexagonal cross-section for structural integrity and close packing of the adjacent reactors. The dielectric cylinder 20 is preferably made of a material that has a melting point high enough to withstand the temperature generated by corona discharge and a low loss tangent at the drive frequency of the corona discharge, typically in the range of about 5–15 MHz. Examples of suitable dielectric materials include fused silica and high purity alumina. The dielectric cylinder 20 has an inner surface 24 which defines a reactor chamber 26 through which the exhaust gas passes and in which chemical reactions are induced by corona discharge.

An inner electrode 28 is made of a conductive material, preferably a metal, which is deposited on the inner dielectric surface 24 to form an intimate and secure surface contact with the dielectric. Vapor deposition is the preferred method for attaching the inner electrode 28 to the inner dielectric surface 24. Vapor deposition involves depositing a thin film of a metal on a surface by first evaporating the metal to a vapor form, and then condensing the metal vapor on the surface in a vacuum. For this invention, only a thin elongate portion of the inner surface 24 of the dielectric cylinder 20 is metallized to form the inner electrode 28. The inner surface is therefore shielded except for the site for the inner electrode. Shielding is preferably achieved by a tube liner that covers most portions of the inner dielectric surface 24 but exposes an elongate narrow surface that is to be metallized to form the inner electrode along the length of the cylinder's inner surface. Regardless of the method of deposition, the inner electrode 28 preferably has a substantially uniform thickness along the length of the dielectric cylinder 20 to ensure that no portion of the inner electrode 28 is so thin that it produces a large resistance that could block current flow during a corona discharge.

The outer electrode 22 is preferably deposited on the outer dielectric surface 25 by the same method of metal deposition as that chosen for the inner electrode 28. The outer electrode 22 covers the entire outer surface 25 of the dielectric cylinder 20 except near the ends of the cylinder 20.

Figure 3A:
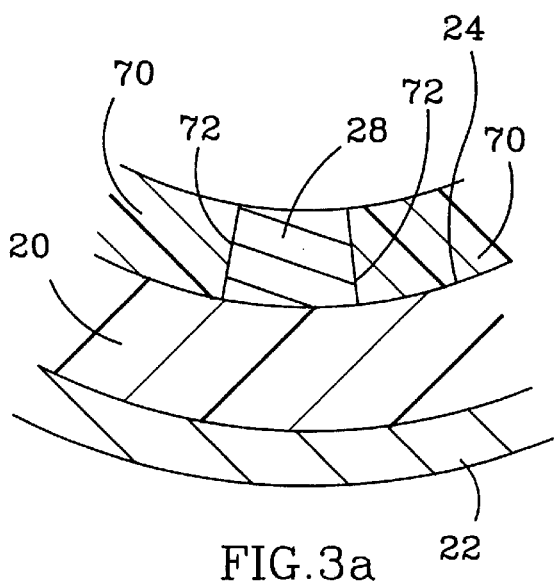
FIG. 3a is a sectional view of a portion of the reactor of FIG. 2 with a tube liner masking the inner dielectric surface.
Figure 3B:
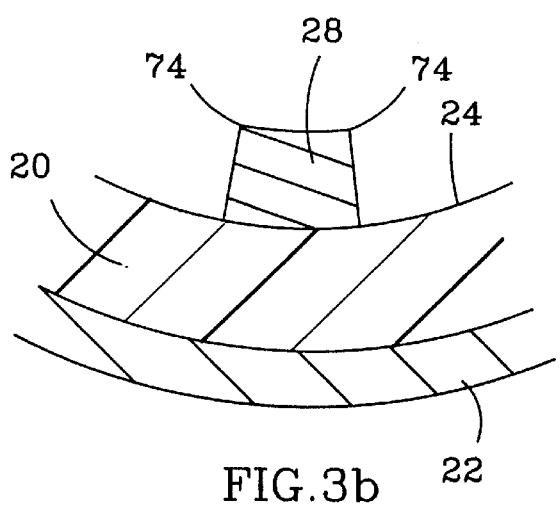
FIG. 3b is a sectional view of FIG. 3a after the tube liner is removed.

FIG. 3a shows a portion of the reactor chamber with the inner dielectric surface 24 masked by a tube liner 70, which has a gap for the portion on which the inner electrode 28 is deposited. The tube liner 70 preferably has sharp edge surfaces 72 that are substantially perpendicular to the inner dielectric surface 24, so that an inner electrode of a substantially rectangular crosssection can be formed. FIG. 3b shows the reactor chamber portion after the tube liner 70 of FIG. 3a is removed. The inner electrode 28 has a substantially rectangular cross-section with sharp corners 74, which accumulate high concentrations of electric charges when energized by a high voltage. Higher charge concentrations at these corners generate greater localized electric field intensities, thereby producing a more intensive corona discharge. Compared to a wire inner electrode of a circular cross-section, the sharp inner electrode corners 74 in FIG. 3b produce a greater corona discharge for the same voltage input, or the same corona discharge for a lower voltage input.

Figure 4:
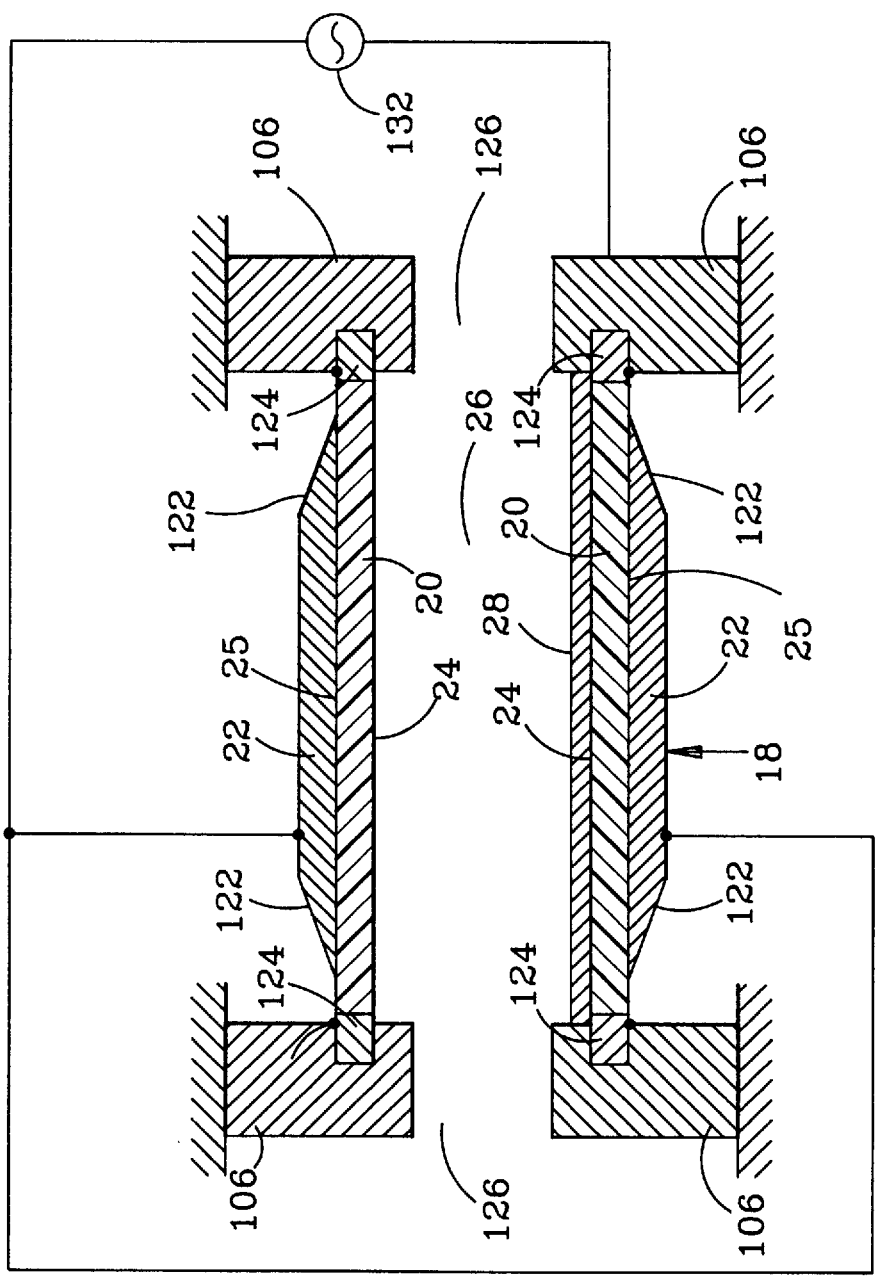
FIG. 4 is a longitudinal sectional view of a corona discharge reactor assembly which incorporates the reactor of FIG. 2.

FIG. 4 shows one embodiment of a mounting assembly for the corona discharge reactor of FIG. 2. Each end of the reactor 18 is mounted to a metallic end plate 106, which has a hole 126 for an exhaust gas to flow through the reactor chamber 26. The outer electrode 22 encloses the outer surface 25 of the dielectric cylinder 20. The inner electrode 28 is deposited on the inner surface 24 of the dielectric cylinder 20. The reactor 18 has two metallized ends 124 which are in electrical contact with the inner electrode 28 and attached to the end plates 106. The outer electrode 22 has transition regions 122 in which its thickness tapers to zero to avoid electrical contact with the metallized ends 124. Tapering of the outer electrode 22 minimizes the possibility of arcing caused by high voltages near the ends of the outer electrode 22. A voltage source 132 supplies high voltage signals across the inner and outer electrodes 28 and 22 to generate corona discharges in the reactor chamber 26.

More than one inner electrode can be deposited in a reactor chamber to enhance the pollutant treatment by generating corona discharges with different electric field patterns emanating from different inner electrodes. The metal vapor deposition that is preferred for a single inner electrode is also preferred for fabricating multiple inner electrodes.

Figure 5:
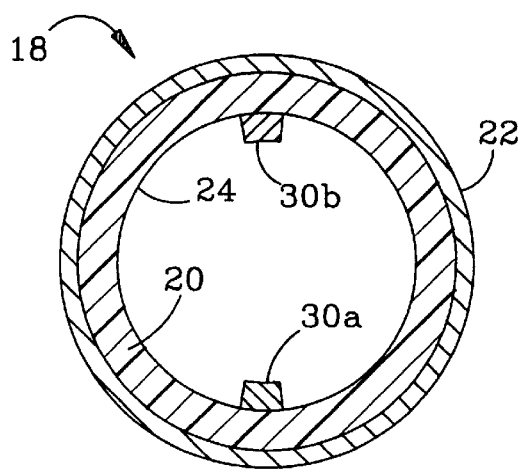
FIG. 5 is a sectional view of another embodiment similar to FIG. 2, but with two deposited inner electrodes separated 180° from each other.

In an embodiment of the present invention shown in FIG. 5, two electrodes 30a, 30b are deposited on the inner surface 24 of the dielectric cylinder 20. The electrodes 30a and 30b are preferably directly opposite each other, that is, 180° apart in the reactor chamber, and are driven by voltages out of phase with each other by either 90° or 270° to increase the volume of corona discharge reaction within the chamber. If the inner electrodes 30a, 30b are fabricated by vapor deposition, a tube liner is used to restrict the deposition to the desired inner electrode locations.

Figure 6:
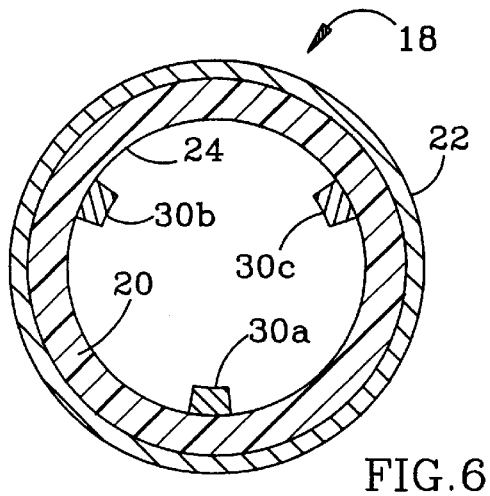
FIG. 6 is a sectional view of another embodiment similar to FIGS. 2 and 5, but with three deposited inner electrodes separated 120° from each other.

FIG. 6 shows another embodiment of the invention with three deposited inner electrodes 38a, 38b, 38c deposited on the inner surface 24. The three inner electrodes 38a, 38b and 38c are preferably equally spaced 120° from each other. They are each energized to generate a corona discharge in a periodic order to enhance the pollutant treatment inside the reactor. To form the inner electrodes by vapor deposition, a tube liner that exposes three thin elongate portions of the inner surface 24 but shields the other portions is used to selectively deposit metallic layers at the desired locations.

Figure 7:
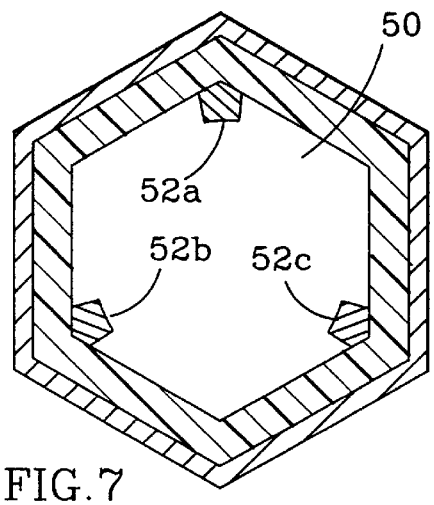
FIG. 7 is a sectional view of a corona discharge reactor chamber having an equilateral hexagonal cross-section, with three deposited inner electrodes at three vertices equally spaced from each other.

Although FIGS. 2–6 illustrate deposited inner electrodes in a cylindrical reactor with a circular cross section, the invention is applicable to reactors with other shapes. For example, a reactor chamber 50 with a hexagonal cross-sectional shape is shown in FIG. 7, with three inner electrodes 52a, 52b, 52c deposited at three alternate vertices of the hexagon. The hexagon is preferably equilateral, with the inner electrodes spaced equally apart from each other to enhance the treatment volume within the reactor chamber.

Figure 8:
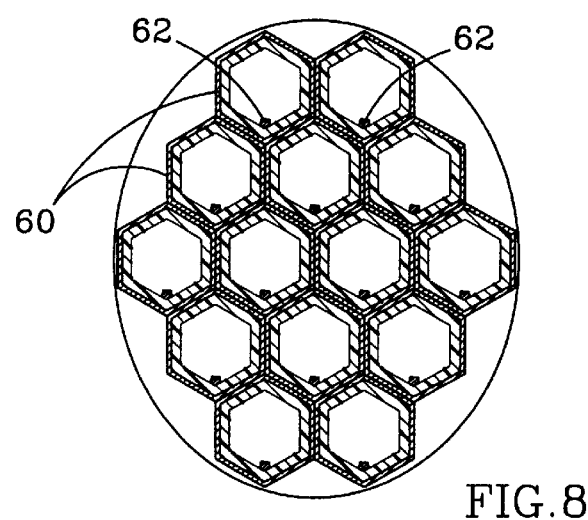
FIG. 8 is a sectional view of a corona discharge pollutant destruction apparatus with multiple reactor chambers.

The invention is also applicable to corona discharge reactors having multiple reactor chambers. A corona discharge apparatus with a plurality of adjacent packed reactor chambers 60 having hexagonal cross-sections is shown in FIG. 8. An inner electrode 62 is deposited on a vertex of the hexagon within each of the reactor chambers 60. Alternatively, each reactor chamber 60 may contain multiple deposited inner electrodes, such as the three-electrode configuration shown in FIG. 7.

Figure 9:
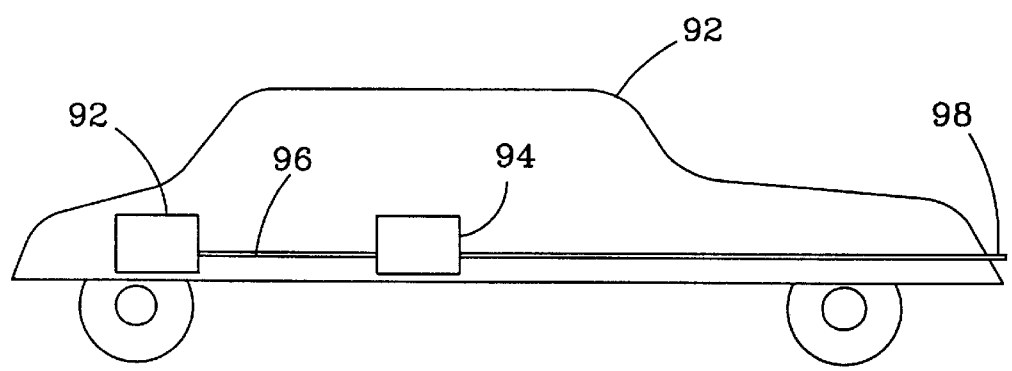
FIG. 9 is a block diagram of an automobile that includes a pollutant destruction reactor in accordance with the invention to treat engine exhaust gas.

This invention is applicable to pollutant treatment using corona discharge in future automobiles to meet stringent air quality standards. In FIG. 9, an automobile 90 has an internal combustion engine 92 which generates a pollutant-bearing exhaust gas that is conveyed through an engine exhaust pipe 96 to a corona discharge reactor 94 with at least one deposited inner electrode in accordance with the invention. The reactor 94 treats the pollutants in the exhaust gas and releases the treated gas to the atmosphere through a tailpipe 98. The reactor 94 may have any of the configurations shown in FIGS. 2–8 and described above. Treatment of automotive exhaust gas by corona discharge is expected to meet future air quality standards that are expected to be more stringent than the presently existing standards.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A corona discharge pollutant destruction reactor, comprising:
    a hollow thermally conductive dielectric having inner and outer surfaces, said inner surface defining a reactor chamber;
    an outer electrode of a conductive material on the outer surface of said dielectric;
    a plurality of mutually spaced inner electrodes of a conductive material deposited upon and having surface contacts with said inner dielectric surface, said surface contacts providing structural support for said inner electrodes on said dielectric and conducting heat from said inner electrodes to said dielectric; and
    a power supply connected to apply respective electrical signals to said inner electrodes to generate corona discharges in the reactor chamber from said inner electrodes, said electrical signals being out of phase with each other so that the volume of corona discharge within said chamber is greater than with in phase signals.

2. The reactor of claim 1, wherein the inner surface of said dielectric has a substantially circular cross-section.

3. The reactor of claim 1, wherein the inner surface of said dielectric has a substantially hexagonal cross-section.

4. The reactor of claim 1, wherein said inner electrodes are spaced substantially equally apart from each other.

5. The reactor of claim 4, wherein two of said inner electrodes are provided and separated by about 180° from each other.

6. The reactor of claim 4, wherein three of said inner electrodes are provided and separated by about 120° from each other.

7. A corona discharge pollutant destruction apparatus, comprising:
    a plurality of corona discharge reactors, each reactor comprising:
        a hollow dielectric having inner and outer surfaces, said inner surface defining a reactor chamber;
        an outer electrode of a conductive material on the outer surface of said dielectric; and
        a plurality of mutually spaced inner electrodes of a conductive material deposited upon and having surface contacts with said inner dielectric surface, said surface contacts providing structural support for said inner electrodes on said dielectric and conducting heat from said inner electrodes to said dielectric; and
    a power supply connected to supply, for each of said reactors, respective electrical signals to the reactor's inner electrodes to generate corona discharges in the reactor chamber from said inner electrodes, said respective electrical signals to the reactor's inner electrodes being out of phase with each other so that the volume of corona discharge within each chamber is greater than with in phase signals;
    said plurality of corona discharge reactors being packed adjacent each other in parallel to receive pollutant bearing gas flow.

8. The apparatus of claim 7, wherein said corona discharge reactors each have a substantially hexagonal cross-section.

9. The apparatus of claim 7, wherein said inner electrodes in each reactor are spaced substantially equally apart from each other.

10. An automobile, comprising:
    an engine capable of generating an exhaust gas that includes at least one type of pollutants; and
    a corona discharge pollutant destruction reactor connected to receive the exhaust gas from said engine and to treat said pollutants within the received exhaust gas, comprising:
        a hollow thermally conductive dielectric having inner and outer surfaces, said inner surface defining a reactor chamber;
        an outer electrode of a conductive material on the outer surface of said dielectric; and
        a plurality of inner electrodes of a conductive material deposited upon and having surface contacts with said inner dielectric surface, said surface contacts providing structural support for said inner electrode on said dielectric and conducting heat from said inner electrodes to said dielectric; and a power supply connected to apply respective electrical signals to said inner electrodes to generate corona discharges in the reactor chamber from said inner electrodes, said electrical signals being out of phase with each other so that the volume of corona discharge within said chamber is greater than with in phase signals.

11. The automobile of claim 10, wherein the inner surface of said dielectric has a substantially circular cross-section.

12. The automobile of claim 10, wherein the inner surface of said dielectric has a substantially hexagonal cross-section.

13. An automobile, comprising:

an engine capable of generating an exhaust gas that includes at least one type of pollutants; and a corona discharge pollutant destruction apparatus connected to receive the exhaust gas from said engine and to treat said pollutants within the received exhaust gas, comprising:

a plurality of corona discharge reactors, each reactor comprising:

a hollow dielectric having inner and outer surfaces, said inner surface defining a reactor chamber;

an outer electrode of a conductive material on the outer surface of said dielectric; and a plurality of mutually spaced inner electrodes of a conductive material deposited upon and having surface contacts with said inner dielectric surface, said surface contacts providing structural support for said inner electrodes on said dielectric and conducting heat from said inner electrodes to said dielectric; and a power supply connected to supply. for each of said reactors, respective electrical signals to the reactor's inner electrodes to generate corona discharges in the reactor chamber from said inner electrodes, said respective electrical signals to the reactor's inner electrodes being out of phase with each other so that the volume of corona discharge within each chamber is greater than with in phase signals;

said plurality of corona discharge reactors being packed adjacent each other in parallel to receive the exhaust gas stream.

14. The automobile of claim 13, wherein said corona discharge reactors each have a substantially hexagonal cross-section.

* * * * *